Figure 1:
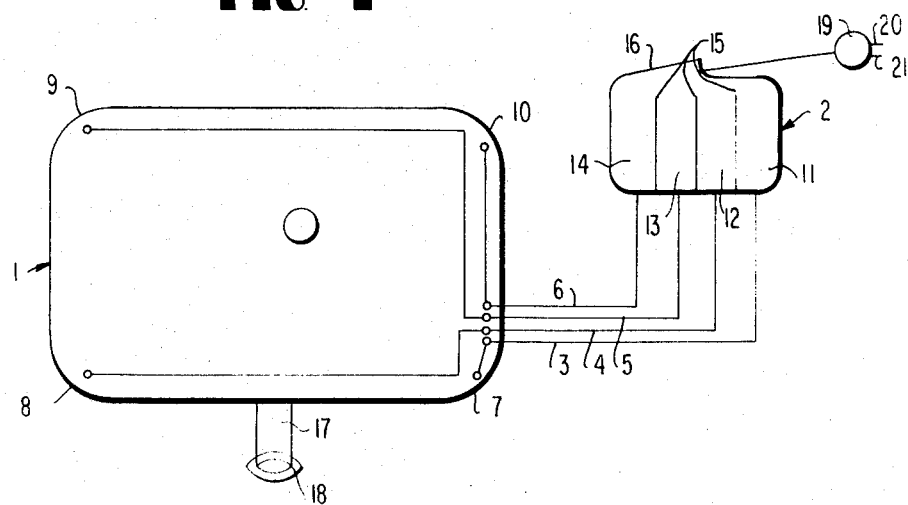

United States Patent [19]
Fricker

[11] 3,777,927
[45] Dec. 11, 1973

[54] FUEL TANK ESPECIALLY FOR VEHICLES
[75] Inventor: Ludwig Fricker, Stuttgart, Germany
[73] Assignee: Daimler-Benz AG, Stuttgart, Germany
[22] Filed: June 16, 1971
[21] Appl. No.: 153,619

[30] Foreign Application Priority Data
June 6, 1970    Germany............P 20 29 546.9

[52] U.S. Cl....... 220/85 R, 220/85 VR, 220/85 VS, 220/85 S, 220/44 R
[51] Int. Cl............................................ B65d 25/00
[58] Field of Search .................. 220/85 VR, 85 VS, 220/85 S, 86 R, 44 R

[56] References Cited
UNITED STATES PATENTS
3,542,239  11/1970  Latvala et al. ................. 220/85 VR
2,944,405   7/1960  Basore et al. .................... 220/85 VS Primary Examiner—Lloyd L. King
Attorney—Craig et al.

[57] ABSTRACT

A fuel tank, especially for motor vehicles, which is equipped with a vent system that consists of vent lines, each leading from an upper corner of the fuel tank to the expansion tank.

9 Claims, 2 Drawing Figures

PATENTED DEC 11 1973

3,777,927

INVENTOR
LUDWIG FRICKER

BY Craig, Antonelli & Hill

ATTORNEYS

FUEL TANK ESPECIALLY FOR VEHICLES

The present invention relates to a fuel tank, especially for motor vehicles, which is equipped with a vent system that consists of vent lines leading to an expansion tank.

Such vent systems, by means of which also a ventilation or aeration of the tank takes place, are provided in order to avoid the overflow of fuel. The tank closure means is constructed tight and the expansion tank is so dimensioned that no fuel can escape out of the expansion tank with the maximum possible thermal expansion of the fuel of the filled tank.

In one proposed construction of the prior art, two vent lines are provided between the fuel tank, properly speaking, and the expansion tank, of which one line begins in the filler pipe connection and the other at a point of the upper tank area. With this prior art type of construction, however, it may happen with a very full fuel tank and especially with a lateral inclination of the vehicle that a gas cushion present in the fuel tank is so unfavorably enclosed that it cannot escape by way of the two vent lines since it is no longer in communication with the beginnings thereof. In case of a warming up, the gas cushion then expands and expels more fuel into the expansion tank than the latter can hold. An overflowing of the fuel out of the expansion tank is then unavoidable.

The present invention is concerned with the task to so construct a fuel tank of the aforementioned type that under all operating conditions, i.e., also at maximum possible thermal expansion and with a very full fuel tank, an over-flowing of fuel out of the expansion tank is prevented. The present invention essentially consists in that the vent lines extend from each upper corner of the fuel tank to the expansion tank. It is prevented with certainty by such a construction that a gas cushion may form within the fuel tank which is not in communication with the expansion tank by way of a vent line. Consequently, the expansion tank only has to have the size and dimensions which correspond to the maximum thermal expansion of the maximum tank content. Since every gas cushion can escape, the fuel quantity fed to the expansion tank is independent of the thermal expansion of the gas cushion.

In order to prevent the fuel which has already entered or penetrated a vent line, can prevent the escape of a gas cushion, it is advantageous if a separate vent line is provided for each corner. Since fuel tanks are generally constructed four-cornered in shape, according to the present invention four vent lines are provided between the fuel tank and the expansion tank. In order to prevent that the escape of a gas cushion can be made difficult by the fuel present in the expansion tank, the vent lines may each terminate in its own chamber of the expansion tank. The chambers of the expansion tank may then be in communication with each other within the upper area thereof.

The same purpose can be attained in a simple manner in that the vent lines are connected to the top of the expansion tank which is connected at its bottom with the fuel tank by way of a return line. Advantageously, the return line may terminate in an opening for a tank-indicating apparatus. An additional seal is economized thereby. The return line may also have a larger inner diameter than the vent line.

Accordingly, it is an object of the present invention to provide a fuel tank system, especially for motor vehicles, which avoids by simple means the aforementioned shortcomings and drawbacks encountered in the prior art.

Another object of the present invention resides in a fuel tank, especially for motor vehicles, which reliably assures an escape of any gas cushion present in the fuel tank under all operating conditions.

A further object of the present invention resides in a fuel tank equipped with an expansion tank in which the size of the expansion tank only has to take care of the thermal expansion of the fuel regardless of the thermal expansion of any existing gas cushion.

Still another object of the present invention resides in a fuel tank of the type described above which is simple in construction, easy to install and economic as regards the number of seals which are required.

Figure 2:
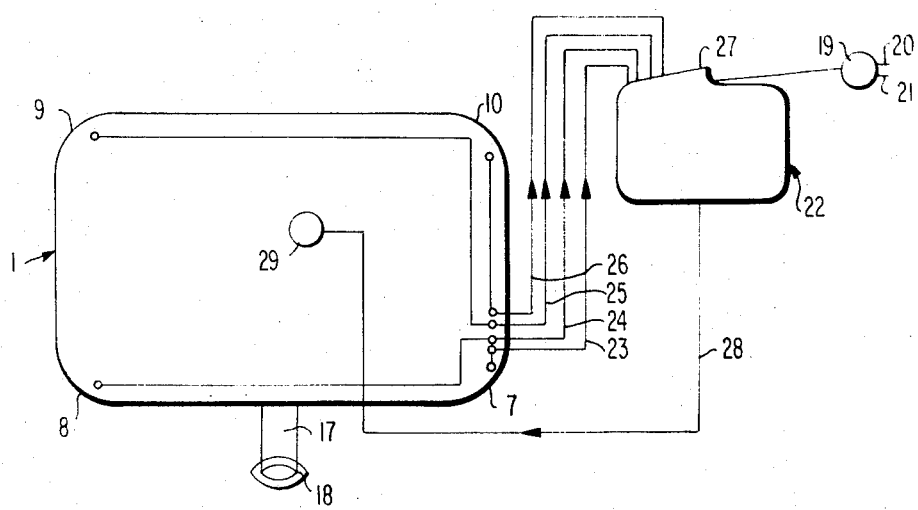

These and further objects, features and advantages of the present invention will become more obvious from the following description when taken in connection with the accompanying drawings which shows, for purposes of illustration only, two embodiments in accordance with the present invention, and wherein:

FIG. 1 is a schematic view of a first embodiment of a fuel tank in accordance with the present invention; and FIG. 2 is a schematic view of a further embodiment of a fuel tank in accordance with the present invention.

Referring now to the drawing wherein like reference numerals are used throughout the two views to designate like parts, and more particularly to FIG. 1, a fuel tank generally designated by reference numeral 1 is illustrated in this figure in plan view to which an expansion tank generally designated by reference numeral 2 is coordinated, which is illustrated in FIG. 1 in schematic side or vertical cross-sectional view. The expansion tank 2 is arranged above the fuel tank 1 so that fuel fed into the expansion tank 2 as a result of thermal expansion or other influences can flow back into the fuel tank 1 without additional feed devices. The content (volume) of the expansion tank is so dimensioned and selected that it corresponds to the volume, by which the fuel present in the fully filled fuel tank 1 is able to expand at a maximum permissive temperature difference, for example, at a temperature difference of 30°C.

In order to prevent that fuel is fed into the expansion tank 2 in the manner of a spray bottle due to the thermal expansion of gas bubbles enclosed in the fuel tank 1, four vent lines 3, 4, 5, and 6 are provided between the fuel tank 1 and the expansion tank 2 which extend each from a respective corner 7, 8, 9, and 10 of the fuel tank 1 which posses a generally four-cornered shape. It is thereby prevented that any gas bubbles which may be present with any desired inclination of the fuel tank, are not in communication with the expansion tank 2 by way of one of the connecting lines 3 to 6. The vent lines 3, 4, 5 and 6 are each connected from below to the expansion tank 2 and terminate each in its own chamber 11, 12, 13 and 14 of the expansion tank 2. The chambers 11 to 14 are in communication with each other within the upper area of the expansion tank 2 since the partition walls 15 terminate at a distance from the top side 16 of the expansion tank 2.

The filler pipe connection 17 of the fuel tank 1 is closed tightly by a tank closure means 18 of conventional construction and the aeration and ventilation takes place exclusively by way of the expansion tank 2. A combined aeration and pressure release valve 19 of any conventional construction is thereby connected to the expansion tank 2 which includes a fresh air line 20 and a vent line 21 leading to the crankcase of the combustion engine, not illustrated in detail.

In the embodiment according to FIG. 2, a fuel tank generally designated by reference numeral 1 and having a four-cornered configuration is also shown in plan view, to which is coordinated an expansion tank generally designated by reference numeral 22 which is arranged above the fuel tank 1 and is illustrated in this figure in side view. Four vent lines 23, 24, 25 and 26 are also provided between the expansion tank 22 and the fuel tank 1 which start in the upper corners 7, 8, 9 and 10 of the four-cornered fuel tank 1. The vent lines 23 to 26 terminate in the top side 27 of the expansion tank 22 whose volume is dimensioned in the manner already described as a function of the tank contents. In this embodiment, the interior space of the expansion tank 22 is not subdivided.

Whereas, in the embodiment according to FIG. 1, the vent lines 3 to 6 which are connected from below to the expansion tank 2, simultaneously serve as return lines for the fuel to the fuel tank 1, an additional return line 28 from the expansion tank 22 to the fuel tank 1 has to be provided in the embodiment according to FIG. 2 in which the vent lines 23 to 26 are connected to the top to the expansion tank 22. This return line 28 terminates in an opening 29 of the fuel tank 1 which is intended for the mounting of a fuel tank indicator device. Also, in this embodiment of the present invention, an overflowing of the expansion tank due to thermal expansion of gas cushions present in the fuel tank 1 is prevented with certainty. The aeration and pressure release of the fuel tank 1 takes place in the embodiment according to FIG. 2 in a manner similar to the embodiment according to FIG. 1, for which purpose a combined valve 19 is again provided for the expansion tank 22 which includes a fresh air line 20 and a vent line 21 leading to the crankcase of an internal combustion engine.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What is claimed is:

1. A fuel tank for motor vehicles comprising: a plurality of vent lines extending from spaced upper locations of a fuel tank and expansion means connected to said vent lines for receiving a volume of fuel equal to the maximum possible thermal expansion of a completely filled fuel tank, the fuel tank being of generally polygonal shape, said vent lines extending from each of the upper corners of the fuel tank with a separate vent line provided for each corner, said vent lines being connected to the top of the expansion tank means, the expansion tank means being connected with the fuel tank by way of a return line connected to the bottom area of the expansion tank means.

2. A fuel tank according to claim 1, characterized in that the return line terminates in an opening in the fuel tank for a tank-indicating device.

3. A fuel tank according to claim 2, characterized in that the return line has a larger inner diameter than all the vent lines.

4. A fuel tank for motor vehicles comprising: a plurality of vent lines extending from spaced upper locations of the fuel tank and expansion tank means connected to said vent lines for receiving a volume of fuel equal to the maximum possible thermal expansion of a completely filled fuel tank, said vent lines each terminating in a respective own chamber of said expansion tank means.

5. A fuel tank according to claim 4, characterized in that the chambers of the expansion tank means are in communication with each other in the upper area thereof.

6. A fuel tank for motor vehicles comprising: a plurality of vent lines extending from spaced upper locations of the fuel tank and expansion tank means connected to said vent lines for receiving a volume of fuel equal to the maximum possible thermal expansion of a completely filled fuel tank, said vent lines being connected to the top of said expansion tank means and said expansion tank means being connected with said fuel tank by way of a return line connected to the bottom area of said expansion tank means.

7. A fuel tank according to claim 6, characterized in that the return line terminates in an opening in the fuel tank for a tank-indicating device.

8. A fuel tank according to claim 6, characterized in that the return line has a larger inner diameter than the vent lines.

9. A fuel tank according to claim 8, characterized in that the return line terminates in an opening in the fuel tank for a tank-indicating device.

* * * * *